(12) United States Patent
Carstens et al.

(10) Patent No.: US 10,424,144 B2
(45) Date of Patent: Sep. 24, 2019

(54) METHOD FOR DEACTIVATING LOCKING OF AT LEAST ONE DOOR OF A HOUSING

(71) Applicants: Christian Carstens, Windhagen (DE); Christoph Dautz, Bonn (DE); Jochen Jansen, Bonn (DE); Ramin Benz, Bonn (DE)

(72) Inventors: Christian Carstens, Windhagen (DE); Christoph Dautz, Bonn (DE); Jochen Jansen, Bonn (DE); Ramin Benz, Bonn (DE)

(73) Assignee: Deutsche Post AG, Bonn (DE)

( * ) Notice: Subject to any disclaimer, the term of this patent is extended or adjusted under 35 U.S.C. 154(b) by 25 days.

(21) Appl. No.: 15/166,043

(22) Filed: May 26, 2016

(65) Prior Publication Data

US 2016/0275733 A1  Sep. 22, 2016

Related U.S. Application Data

(63) Continuation of application No. PCT/EP2014/076587, filed on Dec. 4, 2014.

(30) Foreign Application Priority Data

Dec. 5, 2013 (DE) .................. 10 2013 113 554
Apr. 11, 2014 (DE) .................. 10 2014 105 244

(51) Int. Cl.
*G07C 9/00* (2006.01)
*H04W 56/00* (2009.01)
(Continued)

(52) U.S. Cl.
CPC ....... *G07C 9/00896* (2013.01); *A47G 29/141* (2013.01); *A47G 29/16* (2013.01);
(Continued)

(58) Field of Classification Search
CPC ............ G07C 9/00896; E05B 43/005; E05B 47/0001; E05B 65/0003; G06F 1/10
See application file for complete search history.

(56) References Cited

U.S. PATENT DOCUMENTS 3,797,006 A   3/1974 Reininger
5,701,988 A   12/1997 Tsukada
(Continued)

FOREIGN PATENT DOCUMENTS

CN   1771000 A    5/2006
CN   201228506 Y  4/2009
(Continued)

OTHER PUBLICATIONS

H. Krawczyk et al., Request for Comments (RFC) Document 2104, HMAC: Keyed-Hashing for Message Authentication, Feb. 1997, 11 pages, Network Working Group, NY.
(Continued)

*Primary Examiner* — Nabil H Syed
(74) *Attorney, Agent, or Firm* — Reinhart Boerner Van Deuren P.C.

(57) ABSTRACT

The invention relates to a method for deactivating the locking of at least one door of an accommodating device, said method comprising: effecting the unlocking of the at least one door, measuring the time since at least one event detected by an access-monitoring device of the accommodating device has occurred, and effecting, if the at least one door is open and the measured time exceeds a specified time threshold value, the deactivation of the locking of the at least one door in such a way that the at least one door cannot be locked. The invention further relates to an access-monitoring device, a computer program, an accommodating device, a system, and a use of the accommodating device.

20 Claims, 7 Drawing Sheets

(51) Int. Cl.
| | | |
|---|---|---|
| H04L 29/06 | (2006.01) | |
| G06F 1/12 | (2006.01) | |
| H04L 9/08 | (2006.01) | |
| G06F 1/24 | (2006.01) | |
| H04W 12/08 | (2009.01) | |
| H04W 4/80 | (2018.01) | |
| A47G 29/14 | (2006.01) | |
| A47G 29/16 | (2006.01) | |
| G07F 17/12 | (2006.01) | |
| G06Q 10/08 | (2012.01) | |
| H04L 9/32 | (2006.01) | |
| H04L 9/00 | (2006.01) | |
| E05B 43/00 | (2006.01) | |
| E05B 65/00 | (2006.01) | |
| E05B 47/00 | (2006.01) | |
| E05B 65/52 | (2006.01) | |
| E05C 9/08 | (2006.01) | |
| E05C 9/18 | (2006.01) | |
| H04L 9/14 | (2006.01) | |
| H04L 9/30 | (2006.01) | |
| G06F 1/10 | (2006.01) | |
| G06F 21/31 | (2013.01) | |
| H04L 7/00 | (2006.01) | |
| G06F 1/04 | (2006.01) | |
| H04L 9/06 | (2006.01) | |

(52) U.S. Cl.
CPC ........ *E05B 43/005* (2013.01); *E05B 47/0001* (2013.01); *E05B 65/0003* (2013.01); *E05B 65/0078* (2013.01); *E05B 65/5246* (2013.01); *E05C 9/08* (2013.01); *E05C 9/18* (2013.01); *G06F 1/10* (2013.01); *G06F 1/12* (2013.01); *G06F 1/24* (2013.01); *G06F 21/31* (2013.01); *G06Q 10/083* (2013.01); *G06Q 10/0836* (2013.01); *G07C 9/00* (2013.01); *G07C 9/00111* (2013.01); *G07C 9/00119* (2013.01); *G07C 9/00182* (2013.01); *G07C 9/00309* (2013.01); *G07C 9/00817* (2013.01); *G07C 9/00904* (2013.01); *G07C 9/00912* (2013.01); *G07F 17/12* (2013.01); *H04L 7/0012* (2013.01); *H04L 9/00* (2013.01); *H04L 9/08* (2013.01); *H04L 9/0819* (2013.01); *H04L 9/14* (2013.01); *H04L 9/302* (2013.01); *H04L 9/3242* (2013.01); *H04L 9/3247* (2013.01); *H04L 9/3249* (2013.01); *H04L 63/045* (2013.01); *H04L 63/062* (2013.01); *H04L 63/10* (2013.01); *H04W 4/80* (2018.02); *H04W 12/08* (2013.01); *H04W 56/001* (2013.01); *A47G 2029/149* (2013.01); *G06F 1/04* (2013.01); *G07C 2009/0092* (2013.01); *G07C 2009/00373* (2013.01); *G07C 2009/00412* (2013.01); *G07C 2009/00468* (2013.01); *G07C 2009/00642* (2013.01); *G07C 2209/08* (2013.01); *G07C 2209/63* (2013.01); *G07C 2209/64* (2013.01); *H04L 9/0637* (2013.01); *H04L 9/088* (2013.01); *H04L 2209/805* (2013.01)

(56) References Cited

U.S. PATENT DOCUMENTS

| | | | |
|---|---|---|---|
| 6,552,649 B1* | 4/2003 | Okada | B60R 25/2036 307/10.1 |
| 2002/0033607 A1* | 3/2002 | Worrall | E05B 63/0069 292/202 |
| 2005/0174237 A1 | 8/2005 | Maniaci | |
| 2012/0182122 A1* | 7/2012 | Nishiguchi | H04W 52/283 340/5.61 |

FOREIGN PATENT DOCUMENTS

| | | |
|---|---|---|
| CN | 201546464 U | 8/2010 |
| DE | 199 61 877 A1 | 9/2000 |
| DE | 103 29 969 A1 | 1/2005 |
| DE | 20 2011 101 134 U1 | 9/2011 |
| DE | 20 2012 001 226 U1 | 10/2012 |
| DE | 20 2012 012 010 U1 | 3/2013 |
| EP | 0 708 423 A1 | 4/1996 |
| EP | 2 595 341 A1 | 5/2013 |

OTHER PUBLICATIONS

Jh. Song et al., Request for Comments (RFC) Document 4493, The AES-CMAC Algorithm, Jun. 2006, 20 pages, Network Working Group, The Internet Society, WA.

* cited by examiner

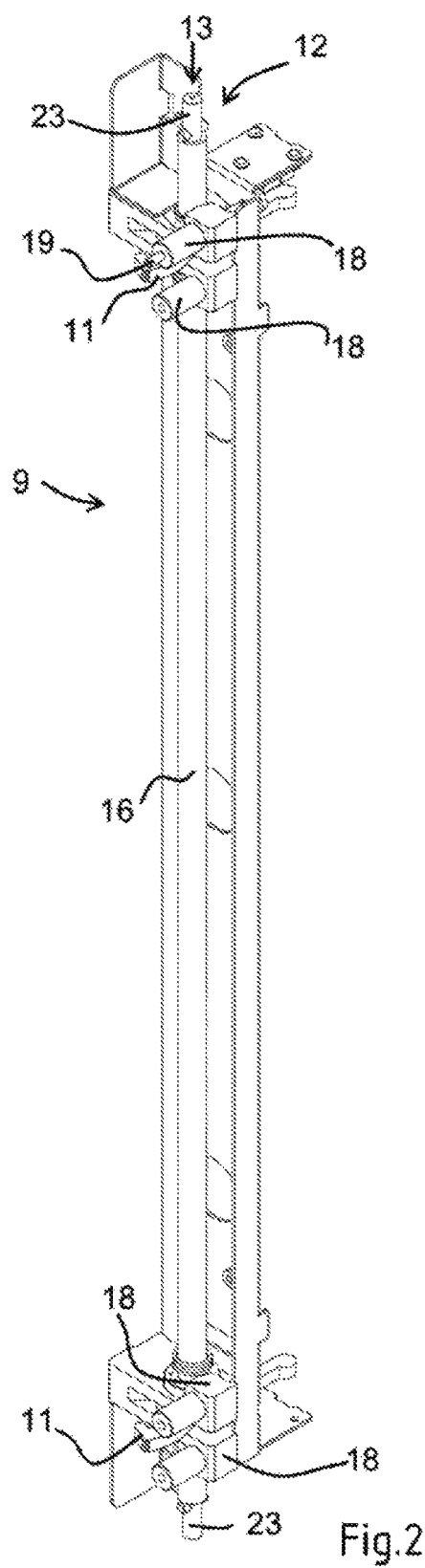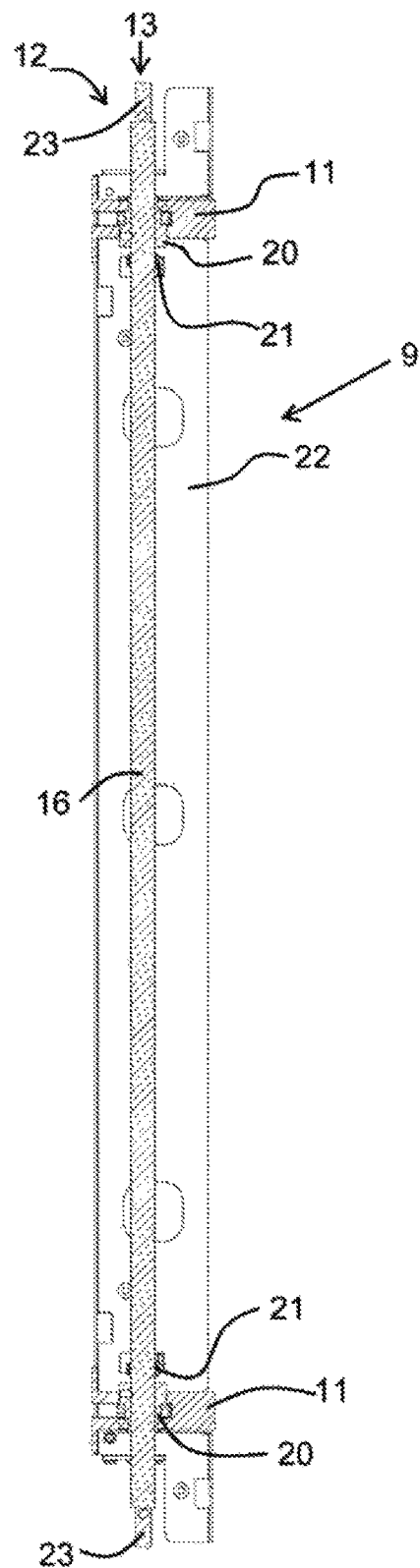

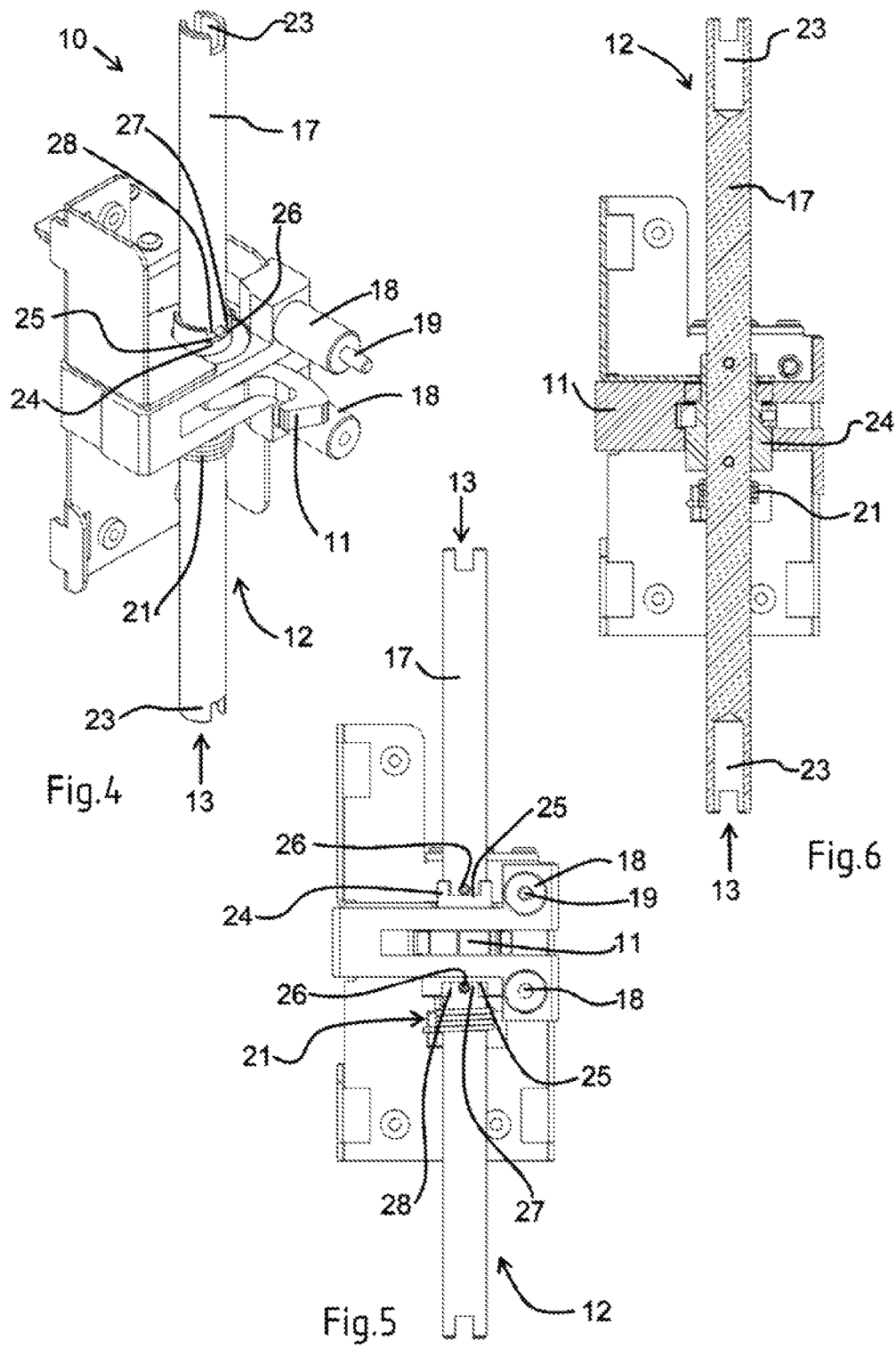

METHOD FOR DEACTIVATING LOCKING OF AT LEAST ONE DOOR OF A HOUSING

CROSS-REFERENCE TO RELATED PATENT APPLICATIONS

This patent application is a continuation of PCT/EP2014/076587, filed Dec. 4, 2014, which claims priority to German Application No. 10 2013 113 554.4, filed Dec. 5, 2013, and German Application No. 10 2014 105 244.7, filed Apr. 11, 2014, the entire teachings and disclosure of which are incorporated herein by reference thereto.

FIELD

Exemplary embodiments of the invention relate to a method for deactivating locking of at least one door of a housing.

BACKGROUND

Access control systems are used in many respects, for example for controlling the access of persons to rooms of a building, as is the case in hotels, office complexes or laboratories for example, to events or else in an abstract form to functions, resources or services, for example computer functions or resources or server services.

A specific use of access control systems is also that of controlling the access of persons to openings of containers, for example deposit boxes or goods delivery containers, in particular parcel boxes. Parcel boxes allow a novel form of delivering/collecting parcels for persons who also wish to receive or send parcels at or in the vicinity of their residence even in their absence. For this purpose, parcel boxes are usually installed in front of the residence belonging to the parcel box user—similar to a mailbox, but with a larger volume capacity—and parcels are then delivered by the delivery agent by placing them in the parcel box or are collected by removing them from the parcel box. In order to prevent misuse and theft, the parcel box must have a lock which can be used to lock the doors of the parcel box. For example, the lock has a latch function, with the result that the door is automatically locked upon closing. However, the problem is that the parcel boxes are installed outside and are not continuously supervised, with the result that there could be the risk of playing children, for example, inadvertently getting locked in the parcel boxes.

SUMMARY OF SOME EXEMPLARY EMBODIMENTS OF THE INVENTION

The object of the present invention is therefore, inter alia, to overcome these problems.

The invention discloses a method for deactivating locking of at least one door of a receiving apparatus, which method comprises the following: causing unlocking of the at least one door of the receiving apparatus, measuring the time since at least one event captured by an access control apparatus of the receiving apparatus took place, and, if the at least one door is open and the measured time exceeds a predetermined time threshold value, causing deactivating of locking of the at least one door in such a manner that the at least one door is not lockable.

For example, the method according to the invention is performed at least partially by an access control apparatus and/or by respective means of the access control apparatus, for example an access control apparatus of the receiving apparatus.

The invention discloses an access control apparatus which comprises the following: means configured to perform and/or control the method according to the invention or respective means for performing and/or controlling the steps of the method according to the invention (for example all steps which are not performed by a user). For example, the means of the access control apparatus according to the invention are configured to perform and/or control the method according to the invention or its steps (for example apart from the steps which are performed by a user). One or more of the steps of the method according to the invention can also be performed and/or controlled by the same means. For example, one or more of the means of the access control apparatus may be at least partially formed by one or more processors.

For example, the apparatus according to the invention comprises at least one processor and at least one memory which comprises program code, the memory and the program code being configured to cause the apparatus having the at least one processor to perform and/or control at least the method according to the invention. In this case, either all steps of the method according to the invention can be controlled or all steps of the method according to the invention can be performed, or one or more steps can be controlled and one or more steps can be performed.

For example, the access control apparatus according to the invention is an access control apparatus for a receiving apparatus.

The invention also discloses a receiving apparatus which comprises the following: a housing, at least one door for closing at least one housing opening, locking means configured to lock and unlock the at least one door, and the access control apparatus according to the invention.

The invention discloses a system which comprises the following: the receiving apparatus according to the invention, and an access authorization verification apparatus.

The invention also discloses a computer program which comprises the following: program instructions which cause a processor to perform and/or control the method according to the invention when the computer program runs on the processor.

A processor is intended to be understood as meaning, for example, control units, microprocessors, microcontrol units such as microcontrollers, digital signal processors (DSP), application-specific integrated circuits (ASICs) or field programmable gate arrays (FPGAs). In this case, either all steps of the method according to the invention can be controlled or all steps of the method according to the invention can be performed, or one or more steps can be controlled and one or more steps can be performed. The computer program according to the invention can be distributable, for example, via a network such as the Internet, a telephone or mobile radio network and/or a local area network. The computer program according to the invention may at least partially be software and/or firmware of a processor. It may likewise be at least partially implemented as hardware. The computer program according to the invention may be stored, for example, on a computer-readable storage medium, for example a magnetic, electrical, electromagnetic, optical and/or any other type of storage medium. The storage medium may be, for example, part of the processor, for example a (non-volatile or volatile) program memory and/or main memory of the processor or a part of the latter.

The invention also discloses a use which comprises the following: use of the receiving apparatus according to the invention in such a manner that the at least one door of the receiving apparatus is closed in order to prevent the causing deactivating of locking of the at least one door in such a manner that the at least one door is not lockable.

The invention also discloses a user method which comprises the following: closing the at least one door of the receiving apparatus according to the invention.

The features of the method according to the invention, of the access control apparatus according to the invention, of the receiving apparatus according to the invention, of the system according to the invention, of the computer program according to the invention, of the use according to the invention and of the user method are described below, partially by way of example.

An access control apparatus such as the access control apparatus according to the invention is intended to be understood as meaning, for example, an apparatus at which access control is performed, for example access to rooms of buildings (for example hotels, office complexes, laboratories) or spaces of apparatuses (for example receiving apparatuses), to events (for example concerts, sports events), to functions (for example of a computer, for example via a login), to resources or to services (for example to a service provided by a server, for example online banking, social networks, email accounts) is controlled there. Examples of access to spaces of apparatuses are access to receiving spaces of receiving apparatuses, for example deposit boxes, lockers, refrigerators, goods delivery containers, mailboxes, parcel boxes which are each closed with doors and are secured using locking means, for example. A parcel box may have, for example, at least one receiving compartment for parcels. A parcel box may also be provided, for example, with a letter slot and possibly with a receiving compartment for letters.

Access control may involve, for example, deciding, at least partially on the basis of access authorization information obtained at the access control apparatus, whether access can be granted. If it is decided that access can be granted, access is, for example, granted, for example by transmitting a control signal, for example to a locking means, in order to unlock and/or open, for example, a door to one or more spaces (for example receiving spaces of a receiving apparatus) in order to enable access to the one or more spaces.

The access authorization information can be obtained at the access control apparatus, for example by means of corresponding inputs by a user on input means of the access control apparatus. The input means are configured, for example, to record inputs by a user. An example of such input means is a keyboard, a microphone, a scanner, a camera and/or a touch-sensitive display.

Alternatively or additionally, the access authorization information can be obtained at the access control apparatus by receiving the access authorization information at communication means of the access control apparatus. The communication means are configured, for example, to wirelessly communicate with an access authorization verification apparatus belonging to a user. One example of such communication means is a communication interface, for example a communication interface of a wireless communication technology. An example of a wireless communication technology is radio-frequency identification (RFID) and/or near field communication (NFC) and/or Bluetooth (for example Bluetooth Version 2.1 and/or 4.0). RFID and NFC are specified, for example, according to the ISO standards 18000, 11784/11785 and the ISO/IEC standards 14443-A and 15693. The Bluetooth specifications are available from www[dot]Bluetooth[dot]org.

The access authorization verification apparatus is, for example, a portable electronic device and/or a portable electronic unit. The access authorization verification apparatus is configured, for example, to communicate with the communication means of the access control apparatus, for example to communicate access authorization information to the communication means. For example, the access authorization verification apparatus may comprise corresponding communication means, for example an analog circuit for transmission and reception (also referred to as a transmitter/receiver or transceiver), a circuit (for example a digital circuit and/or a processor) and a memory (for example an EEPROM—electrically erasable programmable read-only memory). One example of an access authorization verification apparatus is, for example, a user device such as a mobile telephone, a personal digital assistant (PDA), a media player (for example an iPod) and/or a navigation device. A further example of an access authorization verification apparatus is, for example, a delivery agent device belonging to a delivery agent of a delivery service such as a handheld scanner such as the Honeywell LXE Tecton MX7 (for example if the access control apparatus controls access to a receiving apparatus such as a parcel box). Another example of an access authorization verification apparatus is, for example, a "tag" such as an RFID or NFC tag such as the MiFARE family from NXP.

The access control apparatus may comprise, for example, one or more control means which are configured to check whether access can be granted. For example, the control means are configured to at least partially control the means of the access control apparatus and/or one or more locking means of the at least one door and therefore to be able to cause, for example, unlocking of the at least one door and/or locking of the at least one door. One example of such control means are one or more processors.

One example of locking means of a door is an electronically controllable lock and/or an electronically controllable locking unit. For example, the control means may be configured to control such a lock and therefore to be able to cause, for example, opening of the lock (that is to say unlocking of the door) and/or closing of the lock (that is to say locking of the door). It is conceivable, for example, for the access control apparatus to comprise the locking means. However, the locking means may also be separate from the access control apparatus.

Deactivating locking of the at least one door is intended to be understood as meaning, for example, that the door is not lockable (that is to say can be opened from inside and from outside, for example can be opened by pushing against the door or pulling on the door). For example, locking of the at least one door is deactivated if the function of the locking means described above is at least partially deactivated and/or blocked in such a manner that they cannot lock the door and/or cannot be changed to a latched position and/or closed position. For example, a locking cylinder, a locking hook and/or a bolt of the lock is mechanically blocked. For example, an electrical drive of the lock for moving a locking cylinder, a locking hook and/or a bolt is deactivated. Deactivating locking of the at least one door is also intended to be understood as meaning, for example, that closing of the door (and therefore also locking of the door) is mechanically blocked. For example, a locking cylinder, a locking hook and/or a bolt of the lock is moved into a closed position in such a manner that closing of the door is mechanically blocked. It is also conceivable, for example, for a blocking element arranged on the door or the housing opening to be moved into a blocking position in such a manner that closing of the door is mechanically blocked. For example, the control means of the access control apparatus are configured to cause deactivating of locking of the at least one door (for example by means of corresponding control signals to the locking means and/or a blocking element).

An event captured by the access control apparatus is intended to be understood as meaning, for example, any event which is capturable by the access control apparatus and indicates the presence of a user in the environment of the receiving apparatus. For example, such an event is an event associated with a user activity. If such an event associated with a user activity initiates measuring of the time, the measured time is, for example, a measure of the time elapsed since the last user activity. If the event captured by the access control apparatus is an event associated with a user action, the measured time is a user inactivity time, for example. A user inactivity time indicates, for example, the time which has elapsed since the last event associated with a user action captured by the access control apparatus.

For example, the at least one event captured by the access control apparatus (for example an event associated with a user activity) is detecting a presence of an access authorization verification apparatus in the environment of the access control means, obtaining information such as an item of access authorization information from an access authorization verification apparatus and/or from a user, interacting with a user such as recording an input by the user, causing unlocking of the door and/or opening of the door. For example, the access control apparatus comprises capture means which are configured to capture the at least one event. One example of such a capture means is a sensor such as a door opening sensor and/or an input means and/or a communication means.

A door opening sensor is, for example, a capture means which is configured to capture opening of the at least one door (for example opening of the door by a user) and/or to capture that the at least one door is open. The at least one door is open, for example, when it stands open (for example stands open in such a manner that a receiving compartment of the receiving apparatus which can be closed by the door is freely accessible).

For example, the access control apparatus comprises time measuring means for measuring the time (for example a timer circuit and/or a timer function, for example a timer circuit and/or a timer function of the control means).

The time threshold value is selected or predetermined, for example, in such a manner that the probability of the user (for example the user/delivery agent) who has opened the door still being in the vicinity of the access control apparatus is low. Deactivating locking of the door at this time can therefore prevent the door being locked without supervision and/or unintentionally (for example by children playing). For example, this makes it possible to prevent playing children themselves or others getting locked inside. As additional protection, it is conceivable, for example, to combine the invention with an emergency unlocking function which makes it possible to unlock the door, for example, from a housing opening (for example a receiving compartment) closed by the door, but not from outside the housing opening (for example a receiving compartment).

Shortly before deactivating locking, there may be, for example, a warning signal, for example an acoustic and/or optical warning signal. Deactivating locking of the door is associated, for example, with an increased energy consumption, for example because a latch has to be permanently held in an open position by a drive and/or a blocking element must be moved into a blocking position by a drive in order to deactivate locking. It is therefore advantageous to prevent deactivating of locking of the door. This can be achieved, for example, by closing of the door by a user (for example a delivery agent) (for example as part of the use according to the invention and/or the user method according to the invention). Further advantages of the disclosed invention are described below using exemplary embodiments, the disclosure of which is likewise intended to apply to the respective categories (method, apparatus, system, computer program).

According to one exemplary embodiment of the invention, the receiving apparatus comprises locking means which are configured to lock the at least one door. The locking means comprise, for example, a latch or a latch function which is configured to automatically lock the at least one door upon closing. For example, the electronically controllable lock can be equipped with such a latch, with the result that the control means have to control, for example, only opening of the lock, whereas the lock is locked manually by a user by virtue of the latter using the latch and causing automatic locking of the lock by the latch by shutting the door, for example. When opening the lock for example, the latch is at least temporarily changed to an open position (for example an unlocked position and/or a release position), for example by means of an electric motor, and the latch is changed to a closed position (for example a locked position and/or a closed position), for example by means of spring loading, after the door has been opened. When shutting the door, the latch is displaced from the closed position to the open position and the latch automatically returns to the closed position again after ending the process of shutting the door, for example by means of spring preloading of the latch, with the result that the closed door is locked. A snap closure, for example, has such a latch function. Locking of the at least one door is deactivated, for example, if the latch is held in an open position against the spring loading.

As described above, the control means of the access control apparatus may control a lock of the at least one door, for example. The control means can control the lock, for example, to change a latch of the lock to an open position, with the result that the latch no longer automatically locks the door upon closing. As long as the latch is in the open position, locking of the door is therefore deactivated, for example. Another possible way of deactivating locking of the door is to block the latch, for example, in such a manner that the latch cannot be changed from the closed position to the open position.

According to one exemplary embodiment of the invention, the at least one event captured by the access control apparatus is an event associated with a user activity. As described above, an event associated with a user activity is intended to be understood as meaning, for example, any event which can be caused by a user and/or indicates the presence of a user in the environment of the receiving apparatus. An event associated with a user activity is triggered by a user activity and/or is a user activity, for example. One example of such a user activity is, for example, a presence of a user (for example a user having an access authorization verification apparatus) in the environment of the access control apparatus, obtaining information such as an item of access authorization information from an access authorization verification apparatus belonging to a user and/or from a user, interacting with a user such as recording an input by the user, opening the at least one door and/or closing the at least one door.

According to one exemplary embodiment of the invention, the method further comprises obtaining access authorization information for granting access (for example if the at least one door is closed and locked), deciding whether access can be granted, at least partially on the basis of the access authorization information obtained, and causing unlocking of the at least one door only if it has been decided that access can be granted.

As described above, the access authorization information is obtained, for example, from a user at the access control apparatus (for example a user wishing to have access). For example, the user inputs the access authorization information at the access control apparatus (for example at input means of the access control apparatus) and/or communicates it from an access authorization verification apparatus to the access control apparatus (for example to communication means of the access control apparatus). The access authorization information can be communicated from the access authorization verification apparatus to the access control apparatus, for example, according to a wireless communication technology, for example according to RFID, NFC or Bluetooth. The process of obtaining access authorization information from an access authorization verification apparatus is therefore an event which is capturable by the access control apparatus and is caused by a user. The process of obtaining access authorization information is therefore advantageous for triggering measuring of the time.

Deciding whether access can be granted is intended to be understood as meaning, for example, that a check is performed in order to determine whether the access authorization information obtained authorizes access (for example by the access control apparatus). For example, the control means of the access control apparatus are configured to check whether the access authorization information obtained authorizes access.

The access authorization information can be understood as meaning, for example, information which is evaluated during a check which is performed by the access control apparatus in order to determine whether access can be granted to an entity. The check of the access authorization information need not be the only check as part of the access control; further necessary conditions may be required, for example, so that access can be granted. Examples of access authorization information are, for example, a code or a key which is communicated to the access control apparatus and is compared with a code or a key stored in the access control apparatus in order to decide whether access can be granted in the event of a match. The code or key may additionally be protected against spying, for example by means of encryption. The code or key can be used permanently, for example, or can be changed at regular or irregular intervals. For example, a new code can be generated according to a predetermined rule according to time specifications (for example every day) or each time a code is used. This can be performed both in the access control apparatus and in the access authorization verification apparatus so that both each have corresponding pairs of codes or keys, or can be performed in the access control apparatus and in a unit from which the access authorization verification apparatus receives the code or key.

An alternative exemplary form of access authorization information is described, for example, in EP 1 024 239 A1 in which the access authorization information is in the form of an access token $t_{ij}$ which defines access rights $a_{ij}$, for example in the form: "Grant user $u_i$ access to lock $l_j$ until 2/1/2001". The access rights are then transmitted to a lock and are double-checked. A check is therefore performed, for example, in order to determine whether the user $u_i$ who presents the access token is involved, whether the access token is valid for the lock $l_j$ and whether the validity period "until 2/1/2001" of the lock has not yet expired. The access rights $a_{ij}$ may additionally be provided with a message authentication code (MAC), for example an HMAC according to the Request for Comments (RFC) document 2104. The MAC is based on a key $s_j$ which is known both in a unit which generates the access token and in the lock. The access token $t_{ij}$ then comprises the HMAC and the access rights $a_{ij}$, for example in concatenated form. The lock can then confirm the authenticity of the access token using the received MAC, the received access rights $a_{ij}$ and the key $s_j$ and can then check the access rights $a_{ij}$. Alternatively, the access rights can also be defined as follows according to EP 1 024 239 A1: "Grant the user who knows k access to lock $l_j$ until 1/1/2001". The user must then have both the access token $t_{ij}$ and knowledge of k (a key) in order to gain access to the lock $l_j$ and is provided with both (for example in encrypted form) by a unit which generates the token.

Access is granted, for example, by causing unlocking of the at least one door of the receiving apparatus (for example a parcel box) (for example by the access control apparatus). As described above, the control means may be configured to control the lock and therefore, for example, to be able to cause opening of the lock (that is to say unlocking of the door) and/or closing of the lock (that is to say locking of the door).

The operation of causing unlocking of the at least one door is therefore an event which is capturable by the access control apparatus and is caused by a user (for example by communicating the access authorization information). The process of obtaining access authorization information is therefore an event associated with a user action and is advantageous for triggering measuring of the time.

According to one exemplary embodiment of the invention, the method further comprises detecting a presence of an access authorization verification apparatus in an environment of the access control apparatus (for example by the access control apparatus).

Detecting a presence of an access authorization verification apparatus in an environment of the access control apparatus is intended to be understood as meaning, for example, that the access control apparatus determines that an access authorization verification apparatus is in the environment of the access control apparatus, at least with a high degree of probability.

Detecting by the access control apparatus (for example the communication means) is preferably intended to be performed without any communication between the access control apparatus and the access authorization verification apparatus. For example, the presence of the access authorization verification apparatus in the environment of the access control apparatus changes at least one physical quantity which is capturable by the access control apparatus. For example, the physical quantity is changed in the state in which the access authorization verification apparatus is present in the environment of the access control apparatus in comparison with the state in which the access authorization verification apparatus is not present in the environment of the access control apparatus. For example, the physical quantity is changed solely by introducing the access authorization verification apparatus into the environment of the access control apparatus. If a change in this physical quantity is determined, there is therefore an at least high degree of probability of an access authorization verification apparatus (and a user to whom the access authorization verification apparatus belongs) being in the environment of the access control apparatus.

One example of such a physical quantity is, for example, a current intensity of a current in an antenna of the communication means of the access control apparatus when transmitting a signal and/or when generating an electrical, magnetic and/or electromagnetic field. For example, a resistance of the antenna is changed if an object (for example with ferromagnetic properties, for example with a relative permeability of greater than 1) is moved into the environment of the access control apparatus. For example, a signal with the same power is always transmitted during detecting, with the result that the current in the antenna when transmitting the signal changes if the resistance of the antenna changes. For example, the current is the antenna current when transmitting the signal. For example, the current is the driver current when transmitting the signal (for example the driver current of a driver circuit for the antennas). The signal is a burst signal, for example. It is also conceivable, for example, for the voltage and/or the resistance of the antenna during transmission to be measured instead of the current intensity of the current in the antenna.

An antenna is intended to be understood as meaning, for example, any component which is suitable for emitting (for example radiating) an electrical signal, a magnetic signal and/or an electromagnetic signal to the environment. A component for radiating/emitting a magnetic signal is, for example, a magnetic antenna such as a conductor loop (for example a planar conductor loop) and/or a coil (for example a planar coil). A component for radiating/emitting an electromagnetic signal is, for example, a patch antenna and/or a linear antenna such as a dipole antenna. In particular, a component for generating and/or emitting an NFC signal such as an NFC antenna and/or an NFC coil is also intended to be understood as meaning an antenna.

The environment of the access control apparatus in which a presence of an access authorization verification apparatus is detectable by the access control apparatus can be limited, for example, by reducing the power of a signal transmitted by the communication means. For example, the environment of the access control apparatus is restricted to a spatial region at a distance of less than 5 m, preferably less than 1 m, particularly preferably less than 0.5 m, from the access control apparatus (for example from an antenna of the communication means).

If a presence of an access authorization verification apparatus is detected in this manner, there is therefore at least a high degree of probability of a user actually being in the environment of the access control apparatus. Detecting a presence of an access authorization verification apparatus in an environment of the access control apparatus is an event associated with a user action and is therefore advantageous for triggering the measurement of the time.

According to one exemplary embodiment of the invention, the method further comprises capturing opening of the at least one door (for example by the access control apparatus). As described above, the access control apparatus comprises, for example, a door opening sensor for capturing opening of the door. The door is normally also opened by a user, with the result that it is an event associated with a user action and is therefore advantageous for triggering measuring of the time.

According to one exemplary embodiment of the invention, the method further comprises capturing the event, and starting measuring of the time.

According to one exemplary embodiment of the invention, the method further comprises ending measuring of the time if at least one new event captured by the access control apparatus has taken place, and measuring the time since the at least one new event captured by the access control apparatus took place. In this case, a new event may be any of the events described above, in particular an event associated with a user activity. For example, a new time measurement is started each time the access control apparatus captures a new event (for example a new event associated with a user action). For example, a first measurement of the time since a first event is ended if a new (that is to say a subsequent, second) event takes place after the first event and is captured by the access control apparatus. The time since the new event is now measured instead, for example. This is advantageous, for example, in order to ensure that the measured time always represents the time since the last event captured by the access control apparatus (for example the time since the last event associated with a user action).

According to one exemplary embodiment of the invention, the time threshold value is less than or equal to 60 minutes, preferably less than or equal to 15 minutes, particularly preferably less than or equal to 5 minutes (for example, the time threshold value is less than or equal to 2 minutes). For example, the time threshold value is a user inactivity time threshold value for a user inactivity time. If the user inactivity time exceeds the time threshold value, deactivating of locking of the door is caused, for example.

According to one exemplary embodiment of the invention, the method further comprises measuring (for example by the access control apparatus) the unlocking time since the causing of unlocking of the at least one door, and, if the at least one door has not been opened since the causing of unlocking and the measured unlocking time exceeds a predetermined unlocking time threshold value, causing locking of the at least one door (for example by the access control apparatus).

The unlocking time threshold value is selected, for example, in such a manner that no opening of the unlocked door can be expected. The unlocking time threshold value is, for example, less than 60 minutes, preferably less than 15 minutes, particularly preferably less than 5 minutes (for example, the unlocking time threshold value is less than or equal to 2 minutes).

This is advantageous, for example, in order to counteract unwanted unlocking and/or to protect objects in a receiving apparatus.

For example, the method further comprises causing the access control apparatus to switch to an energy-saving mode if the measured unlocking time exceeds the unlocking time threshold value.

It is also conceivable for a different measured time (for example a user inactivity time) and/or a different time threshold value (for example a user inactivity time threshold value) to be used to switch the access control apparatus to an energy-saving mode. For example, the access control apparatus switches from an active mode to the energy-saving mode.

An active mode is, for example, an operating mode in which at least all main functions of an apparatus are active. A main function of the access control apparatus is the access control function, for example. For example, the access control apparatus is in the active mode if all of its means and/or components are in the active mode. For example, the access control apparatus is in the active mode if at least the control means, the input means and the communication means of the access control apparatus are in the active mode.

An energy-saving mode is, for example, an operating mode in which an apparatus consumes less energy than in the active mode. For example, at least some functions of an apparatus are reduced and/or deactivated in the energy-saving mode. For example, the input means and/or the communication means of the access control apparatus are deactivated in the energy-saving mode.

The practice of switching to the energy-saving mode is advantageous, for example, in order to reduce the energy consumption of the access control apparatus.

According to one exemplary embodiment of the invention, the method further comprises obtaining access authorization information for activating locking of the at least one door if locking of the at least one door is deactivated, deciding whether access can be granted, at least partially on the basis of the access authorization information obtained, and causing activating of locking of the at least one door only if it has been decided that access can be granted.

The process of obtaining access authorization information for activating locking of the at least one door corresponds, for example, to the above-described process of obtaining access authorization information for granting access. However, the access authorization information is obtained in this embodiment if locking of the at least one door is deactivated.

As described above, the access authorization information is obtained from a user (for example a user wishing to have access) at the access control apparatus, for example. For example, the user inputs the access authorization information at the access control apparatus (for example at input means of the access control apparatus) and/or communicates it from an access authorization verification apparatus to the access control apparatus (for example to communication means of the access control apparatus).

As described above, deciding whether access can be granted is intended to be understood as meaning, for example, that a check is performed in order to determine whether the access authorization information obtained authorizes access (for example by the access control apparatus). For example, the control means of the access control apparatus are configured to check whether the access authorization information obtained authorizes access.

Only if it has been decided that access can be granted is activating of locking of the at least one door caused. As described above, the control means of the access control apparatus, for example, can control a lock of the at least one door. For example, the control means can control the lock to change a latch of the lock from an open position to a closed position, with the result that the latch automatically locks the door again upon closing. As long as the latch is in the open position, locking of the door is deactivated, for example. Changing the latch to a closed position therefore activates locking again. Further possibilities for activating locking of the at least one door are conceivable.

This embodiment is advantageous, for example, in order to make it possible to activate locking of the at least one door if locking has been deactivated. In this case, the decision regarding whether access can be granted can be used to ensure that only authorized users can cause activating of locking of the door (and not playing children, for example).

According to one exemplary embodiment of the invention, the method further comprises opening the at least one door (for example by a user), and/or closing the at least one door (for example by a user). As described above, locking of the door is deactivated only if the door is open. Closing the door can therefore prevent deactivating of locking of the door, for example. This is advantageous, for example, if a latch for deactivating locking has to be permanently held in an open position by a drive and/or a blocking element has to be moved into a blocking position, since such "holding open" and/or "moving" increases the energy consumption of the receiving apparatus.

The above-described exemplary embodiments and exemplary configurations of the present invention are also intended to be understood as having been disclosed in all combinations with one another.

Further advantageous exemplary configurations of the invention can be gathered from the following detailed description of some exemplary embodiments of the present invention, in particular in conjunction with the figures. However, the figures accompanying the application are intended to be used only for the purpose of illustration, but not to determine the scope of protection of the invention. The accompanying drawings are not necessarily true to scale and are intended to reflect, by way of example, only the general concept of the present invention. In particular, features which are included in the figures are not at all intended to be considered to be a necessary part of the present invention.

BRIEF DESCRIPTION OF THE SEVERAL VIEWS OF THE DRAWING

In the drawings:

FIG. 2 shows a three-dimensional view of a locking element module for the first door of the parcel box according to FIG. 1;

FIG. 3 shows a sectional drawing through the locking element module according to FIG. 2;

FIG. 4 shows a three-dimensional view of a locking element module for the second door of the parcel box according to FIG. 1;

FIG. 5 shows a side view of the locking element module according to FIG. 4;

FIG. 6 shows a sectional drawing through the locking element module according to FIG. 4;

DETAILED DESCRIPTION OF THE INVENTION

Figure 1:
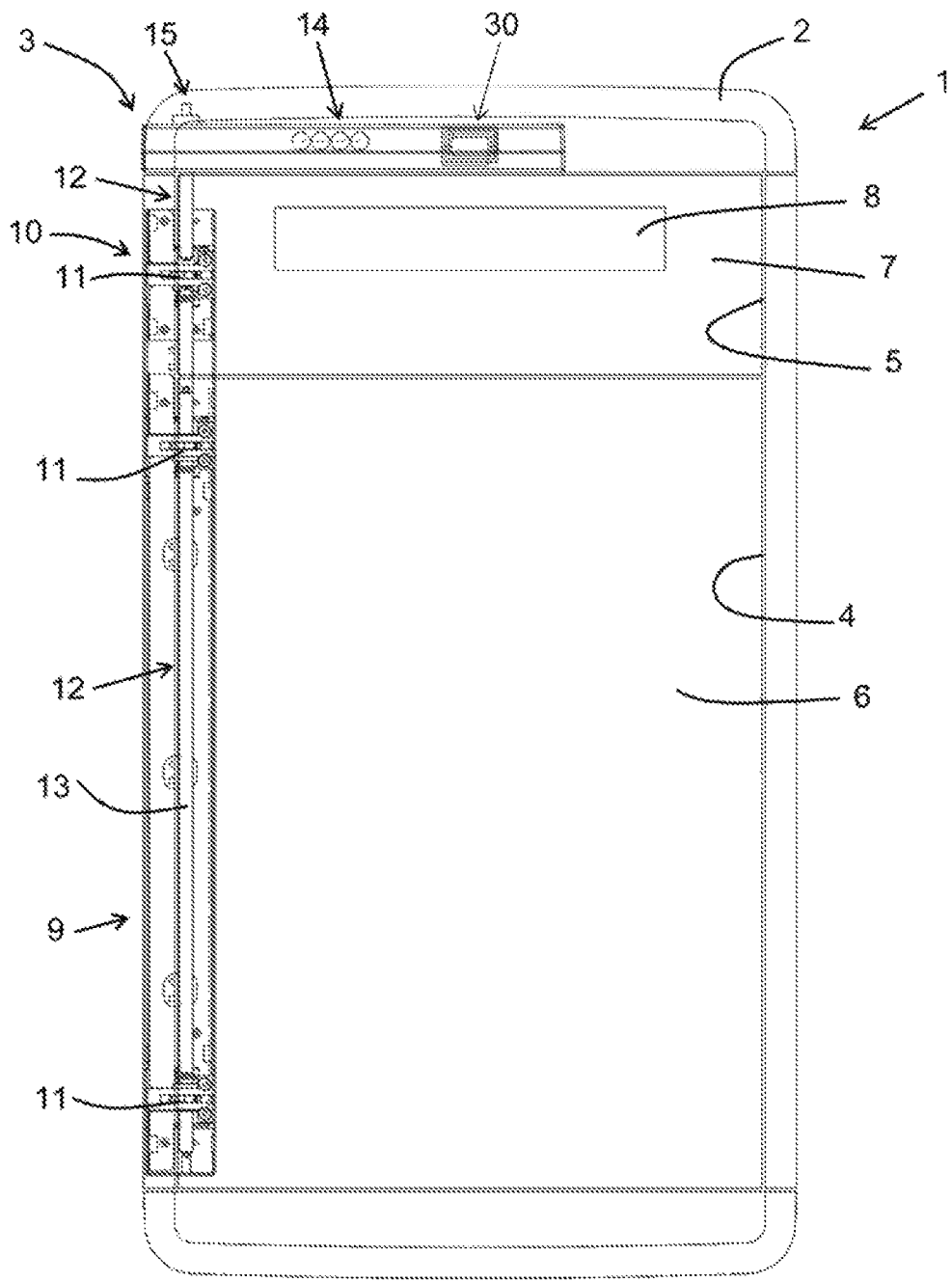
FIG. 1 shows a view of an exemplary embodiment of a parcel box according to the invention.

FIGS. 1 to 9 are used to describe a receiving apparatus according to the invention on the basis of a particularly preferred embodiment as a parcel box 1 for receiving letters and parcels to be delivered. However, it is pointed out that, although the parcel box 1 is a particularly preferred embodiment of the present invention, the latter is not restricted to use in parcel mailboxes; in particular, the access control apparatus according to the invention is not restricted to use in a parcel box such as the parcel box 1 but rather can generally be used in access control systems.

The parcel box 1 comprises a housing 2, a locking unit 3 and an access control apparatus 30 according to the invention. The housing 2 has a first housing opening 4 for a first receiving compartment for parcels and a second housing opening 5 for a second receiving compartment for letters. The parcel box 1 also comprises a first door 6 for closing the first housing opening 4 and a second door 7 for closing the second housing opening 5. The second door 7 has a slot 8 for posting letters without opening the second door 7 of the second receiving compartment. The slot may be provided, for example, with a flap (not illustrated) which is openable outward or inward and is not locked. Both doors 6, 7 are lockable using the locking unit 3.

The locking unit 3 respectively has a locking element module 9, 10 with at least one locking body 11 for each door 6, 7, which is in the form of a locking hook in the example illustrated, and with a locking drive 12 for actuating the locking bodies 11.

In the parcel box 1, the locking element module 9 for the first door 6 has two locking bodies 11, and the locking element module 10 for the second door 7 has only one locking body 11. The locking drive 12 for each of the two locking element modules 9, 10 has a common drive element 13 which is designed as a rotatable shaft in the form of a rod. The rod 13 as a common drive element is designed to be movable (rotatable) around an adjustment path.

In a first adjustment position, the rod 13 changes only the locking body 11 for the first door 6 into an unlocked position. In the second adjustment position, which is reached by further rotating the rod 13 as a common drive element, the locking bodies 11 for all doors 6, 7 are changed into an unlocked position. An electromotive drive 14 is provided for the common drive element 13 of the locking drives 12 of the respective locking element modules 9, 10, which electromotive drive is operatively coupled to the common drive element 13 (rod) by means of a coupling 15 in such a manner that the electromotive drive 14 can move the rod 13 (rotatable shaft as a common drive element) between the different adjustment positions.

The structure of the locking unit 3 is described in more detail below with reference to FIGS. 2 to 9 using the example of the parcel box 1 having two doors 6, 7. As is readily apparent to a person skilled in the art, the features described and/or illustrated can also be applied to other housings 2 with possibly more than two housing openings 4, 5 by virtue of the individual locking element modules 9, 10 being combined with one another or coupled to one another in an accordingly larger number.

The locking element module 9 for the first door 6, illustrated in FIG. 2, has, as a locking drive 12, a first rod part 16 which is connected to a second rod part 17 of the locking element module 10 illustrated in FIG. 4 in order to form the common drive element 13 of the locking unit 3.

Two locking bodies 11 in the form of locking hooks are arranged on the first rod part 16 by virtue of these locking bodies 11 (locking hooks) being secured to the first rod part 16 in an immovable manner, that is to say in a fixed manner and in a non-rotatable manner with respect to the first rod part 16. The first rod part 16 therefore forms the locking drive 12 of the first locking element module 9 for the first door 6 by virtue of the locking hook 11 being immediately concomitantly rotated as a result of rotation of the rod part 16, to be precise from the locked position illustrated in FIG. 2 to an unlocked position in which the locking hook 11 releases a bolt element (not illustrated) of the first door 6, with the result that the door 6 can be opened.

In order to automatically open the first door 6 when the locking hook 11 releases the bolt element of the first door, guide holders 18 for receiving an ejection ram 19 prestressed by means of a compression spring or the like are respectively provided above and below the locking hook in the axial direction. As illustrated in FIG. 2, an ejection ram 19 is generally sufficient to automatically open the door after locking has been released.

A door opening sensor, for example a permanent magnet interacting with a magnet sensor, may be arranged on the ejection ram 19 in order to detect an open state of the door. This can be used, for example, for a logbook function of the access control apparatus 30, which records the opening and closing of the doors 6, 7 of the housing 2 in a logbook. Such a logbook can be retrieved and checked by the user.

It can be gathered from the sectional drawing according to FIG. 3 that the locking bodies 11 in the form of locking hooks are connected to the first rod part 16 of the first locking element module 9 via a mounting sleeve 20, with the result that the mounting sleeve 20 and the locking body 11 cannot be rotated with respect to the shaft (as part of the common drive element 13) formed by the first rod part 16. The forces of a rotation of the first rod part 16 are therefore directly transmitted to the locking hook (locking body 11).

Therefore, it would also be possible, in principle, to connect the locking hook 11 to the first rod part 16 directly, that is to say without providing a mounting sleeve 20. However, the use of the mounting sleeve 20 has the advantage that the same locking body 11 can be used for the first locking element module 9 and the second locking element module 10, which is also described in detail below with reference to FIGS. 4 to 6, using the mounting sleeve 20.

The first locking element module 9 is in the form of a snap closure. This means that the locking bodies 11 are prestressed in the closing direction, that is to say in the locked positions illustrated in FIG. 2. For this purpose, a restoring spring 21 is provided on the first rod part 16 adjacent to the locking body 11, one end of which restoring spring is secured to the first rod part 16 and the other end of which is secured to a locking element module body 22 which carries the elements of the first locking element module 9. If the first rod part 16 is rotated from the closed position of the locking body 11 illustrated in FIG. 2 into an adjustment position in which the locking body 11 releases a bolt element (not illustrated) of the first door 6, the restoring spring 21 is stressed further, with the result that the rod part 16, if it is no longer held in the release adjustment position by the electromotive drive 14, rotates back until the locking body 11 is in the locked position illustrated in FIG. 2.

If an open door 6 is now closed, the locking body 11 is pushed out of the locked position by the bolt element present on the door 6 by virtue of the rod part 16 being rotated counter to the force of the restoring spring 21. As soon as the door 6 is in the closed position, the locking hook in the form of the locking body 11 can surround the bolt element of the door 6, with the result that the rod part 16 is returned to the locked position on account of the restoring force of the restoring spring 21 and the bolt element of the door 6 engages in the hook opening of the locking hook 11. This is referred to as a snap closure. However, other configurations of a snap closure are also conceivable, for example configurations in which a latch is moved in a linear manner counter to the force of a restoring spring when closing a door (for example as in the case of a mortise lock for a room door or apartment door).

The second locking element module 10 for the second door 7 illustrated in detail in FIGS. 4 to 6 has a second rod part 17 which can be coupled to the first rod part 16 via a coupling 23 (also referred to as coupling pieces). For this purpose, elements of the coupling 23 are formed both on the first rod part 16 and on the second rod part 17, which elements engage in one another in a form-fitting manner during connection of the two rod parts 16, 17 and transmit the rotational movement of one rod part 16, 17 directly to the other rod part 16, 17. In a manner similar to the locking element module 9 for the first door 6, the locking element module 10 for the second door 7 also has a locking body 11 which is in the form of a locking hook and can be adjusted between a closed position illustrated in FIG. 4 and an unlocked or release position in which the locking hook 11 releases a bolt element (not illustrated) of the second door 7 by rotating the second rod part 17.

In the unlocked position, the second door 7 is automatically opened by an ejection ram 19 which is provided in a guide holder 18. As in the case of the first locking element module 9 as well, two guide holders 18 are situated on both sides of the locking body 11 in the axial direction, in which case an ejection ram 19 has to be provided only in one of the two guide holders in order to reliably open the second door 7 after it has been unlocked.

Unlike in the first locking element module 9, the locking body 11 of the second locking element module 10 is mounted such that it is rotatable with a defined play about the rotatable shaft 13 formed by the second rod element 17 in the region of the second locking element module 10. This results in a locking body 11 rotatably mounted on the second rod part 17 being concomitantly moved only when the play in the adjustment path of the common drive element 13 or of the second rod part 17 has been exceeded. Only then does the rotational movement of the locking body 11 start, which disengages the locking hook (locking body 11) from the bolt element of the second door 7. Only then is the second door 7 therefore opened and the second housing opening into the receiving compartment for letters enabled.

In order to provide the play, the locking body 11 of the second locking element module 10 is rotatably mounted on the second rod part 17 via a bearing sleeve. For this purpose, the bearing sleeve 24 has a recess 25 which is movably guided on the shaft 13 which is formed by the rod part 17 and is also itself rotatable. For this purpose, a pin 26 radially projecting on the shaft 13 engages in the recess 25 in the bearing sleeve 24. This defines the play for rotating the bearing sleeve 24 on the shaft 25 because the pin 26 can rotate in the recess 25 until it reaches the edge of the recess 25 before the bearing sleeve 24 is concomitantly rotated during a movement of the rod part 17. The locking hook 11 is fixedly connected to the bearing sleeve 24.

As can be gathered from the side view of the locking element module 10 for the second door 7 according to FIG. 5, the bearing sleeve 24 has two recesses 25 at the opposite axial ends of the bearing sleeve 24, in which a pin 26 radially projecting on the rotatable shaft 13 formed by the second rod part 17 respectively engages. This causes the bearing sleeve 24 to be axially fixed by the two pins 26 engaging in the recesses 25, and the play for rotating the bearing sleeve 24 about the shaft 13 is predetermined by the recess 25 in which the pins 26 are accommodated.

In the closed position which is illustrated in FIG. 4 and FIG. 5 and in which the locking hook 11 is in the locked position, the pins 26 are accommodated in a central region of the recess 25 which defines the play for rotating the bearing sleeve 24 on the shaft. This results in two regions of play 27, 28 in the recess 25 for each direction of rotation of the shaft 13 or of the second rod part 17. The first region of play 27 means that the first rod part 17 can be initially rotated in the direction of an opening movement without the locking body 11 being rotated away out of its locked position in which it releases the bolt element of the second door 7. On the other hand, as already explained, the locking body of the first rod part 16 in the first locking element module 9 is already changed to an unlocked position during the rotational movement of the rotatable shaft 13 as the common drive element, with the result that the first door 6 already opens. The first region of play 27 in the recess 25 therefore means that the second door 7 opens only after the first door 6.

If the rotatable shaft 13 as the common drive element is therefore changed only into a first adjustment position in which the radially projecting pin 26 in the recess 25 uses only the first region of play 27 without butting against the edge of the recess 27 and concomitantly moving the bearing sleeve 24, only the first door 6 is unlocked and the second door 7 remains locked. An accordingly controlled rotational movement of the rotatable shaft 17 can therefore deliberately release only the first door 6 for opening.

Only if the rotatable shaft 13 is rotated further into a second adjustment position does the radially projecting pin 26 butting against the edge of the recess 25 entrain the bearing sleeve 24 and therefore the locking hook 11 in order to also unlock the second door 7.

If, in contrast, the second door 7 is open and the rotatable shaft 13 or the second rod part 17 is in the locked position shown in FIGS. 4 and 5, the locking body 11 is pushed out of the locked position illustrated in FIGS. 4 and 5, when shutting the door into its locked position, by virtue of the bolt element of the door butting against the locking body 11. In this case, the bearing sleeve 24 is rotated on the rotatable shaft 13 or the second rod part 17 until the second door 7 is in its closed position and the bolt element of the second door 7 can be surrounded by the locking hook 11. In this position, the locking hook 11, driven by the restoring spring 21, snaps back into the closed position in a similar manner to the case described above for the first locking element module 10.

The second region of play 28 of the recess 25 is provided for this purpose, which second region of play allows a movement of the bearing sleeve 27 (and of the locking body 11 permanently connected to the bearing sleeve 27) without the common drive 26 being concomitantly rotated.

As can be gathered from the sectional drawing according to FIG. 6, the bearing sleeve 24, apart from the pins 26 guided in the recess 25, is mounted in a freely movable manner on the second rod part 17.

In order to couple 23 the second rod part 17 to the first rod part 16, the second rod part 17 has an axial bore with a radially running recess, in which a shaft core (illustrated in FIG. 3) with a radially running pin engages, with the result that the first and second rod parts 17 can be easily plugged into one another in the axial direction and directly transmit a rotation to one another. The shaft core and the axial bore are also referred to as coupling pieces which suitably interact in order to effect the coupling 23.

The coupling pieces of the coupling 23 on the first rod part 16 and the second rod part 17 are formed symmetrically about the horizontal central shaft, with the result that there is left/right exchangeability of the first locking element module 9 and of the second locking element module 10. As a result, the module can be easily changed from a right-hand stop of the door to a left-hand stop of the door or vice versa by means of a rotation through 180°.

In order to also achieve this exchangeability with respect to the engagement of the locking bodies 11 with the bolt elements (not illustrated) of the doors 6, 7, provision is also made for the one or more locking bodies 11 to be arranged on a rod part 16, 17 in a mirror-symmetrical manner in the axial direction based on the horizontal central shaft of the rod part 16, 17. That is to say, the locking bodies are symmetrically arranged on both halves of the rod part 16, 17 based on the center of the rod part 16, 17. The locking bodies 11 are therefore each at the same height axially after a rotation of the locking element module 9, 10 through 180°, with the result that they can accordingly engage with the bolt elements of the doors 6, 7.

Figure 7:
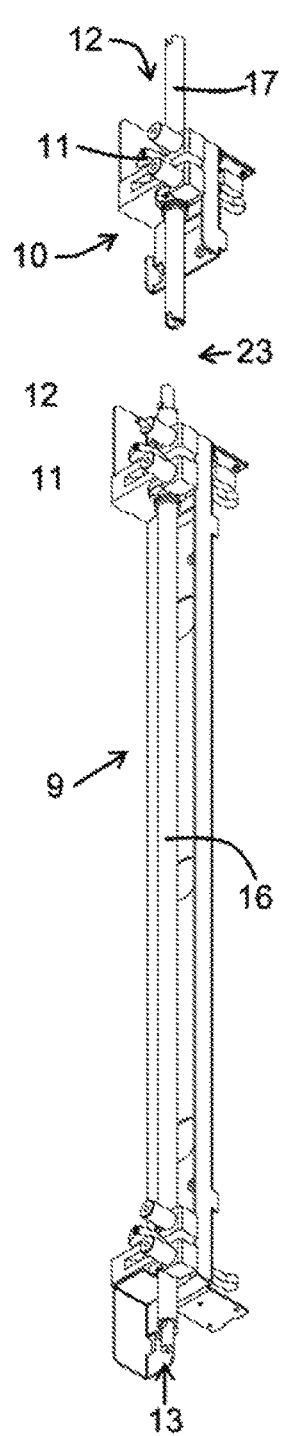
FIG. 7 shows an exploded illustration of the locking element modules according to FIG. 2 and FIG. 4 before they are mounted.

FIG. 7 shows an exploded illustration of the locking element module 9 for the first door and the locking element module 10 for the second door 7, which modules have already been explained in detail above with reference to FIG. 2 and FIG. 4. The locking element modules 9, 10 accordingly have a first rod part 16 and a second rod part 17 which can be plugged into one another via the coupling 23 described above, with the result that, when one rod part 16, 17 is rotated, the other rod part 17, 16 concomitantly rotates.

FIG. 7 illustrates the two elements shortly before they are plugged together. After being plugged together, the first rod part 16 and the second rod part 17 together form the common drive element 13 (rotatable shaft) which can be connected to the electromotive drive 14 via the coupling 15 (cf. FIG. 1). The electromotive drive 14 may also contain a controller with an authentication function which, depending on authentication which has been performed, adjusts the rotatable shaft 13 as the common drive element in such a manner that either only the first door 6 (in particular of the parcel compartment) is opened or the first door 6 and the second door 7 (in particular of the parcel compartment and of the mailbox together) are opened together.

In order to make the snap closure effective, provision may be made for the rotatable shaft 13 to be rotated back into the closed position again, in which the locking bodies 11 have the positions shown in FIGS. 4 and 6, by the electromotive drive 14 after the doors 6 and/or 7 have been opened, in a manner verified, for example, by means of a corresponding door opening sensor in conjunction with the ejection ram 19 for each door 6, 7.

Figure 8:
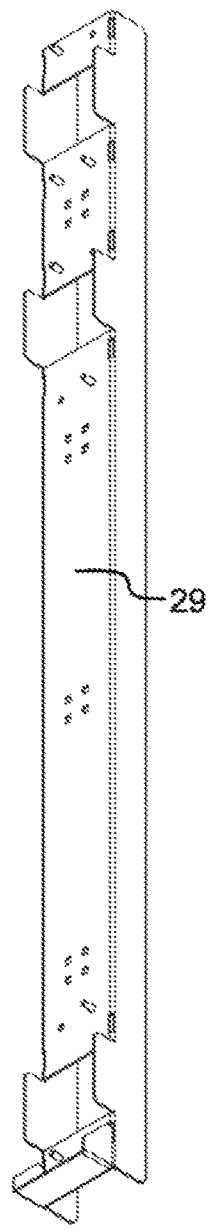
FIG. 8 shows a mounting support for mounting the connecting element modules.

After the locking element modules 9, 10 have been plugged together, they can be mounted on the mounting support 29 in the form of a mounting plate shown in FIG. 8, the locking element modules 9, 10 being able to be fitted in each of the two possible positions rotated through 180° for a right-hand stop or a left-hand stop of the doors 6, 7.

Figure 9:
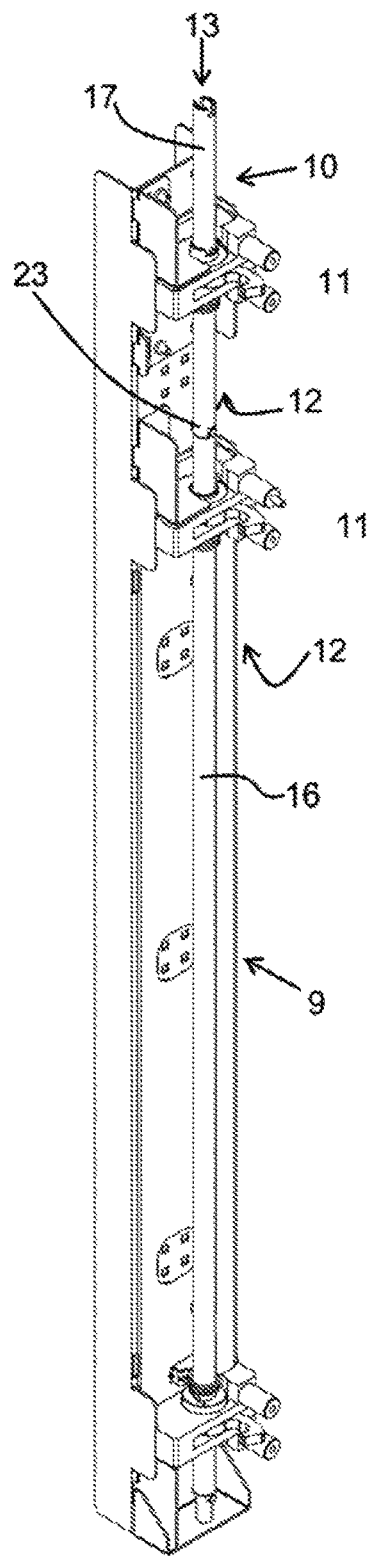
FIG. 9 shows a three-dimensional view of locking element modules according to FIG. 2 and FIG. 4 mounted on the mounting support according to FIG. 8.

FIG. 9 shows the mounting support 8 with the locking element modules 9, 10 mounted thereon, the first and second rod parts 16, 17 of which have been joined to form the common drive element 13 (rotatable shaft).

The proposed locking unit 3 proposes a locking mechanism which is easy to handle for a housing 2 with housing openings 4, 5 which are each closable and lockable by means of doors 6, 7, a first group of doors 6 being able to be unlocked separately by changing a common drive element 13 of the locking unit 3 into a first adjustment position. The two doors 6, 7 are then unlocked together when the common drive element 13 is changed into a second adjustment position. This use is particularly well suited to a parcel box in which a parcel delivery agent can open and close the first door of the parcel compartment independently of the second door of the letter compartment.

Figure 10:
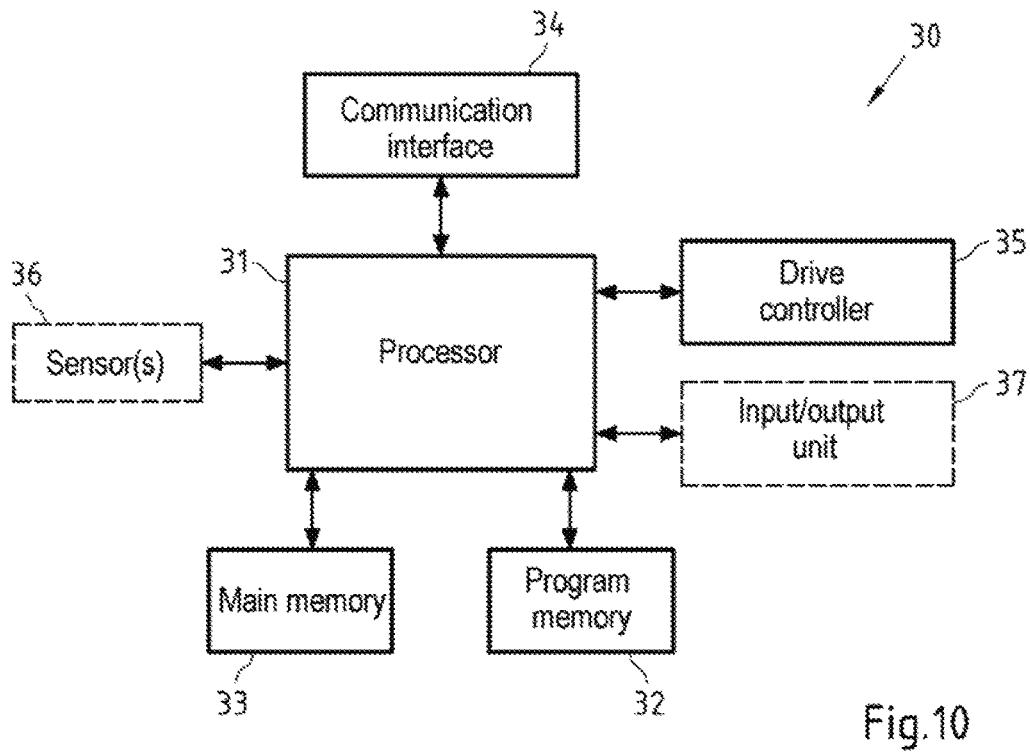
FIG. 10 shows a block diagram of the electronic components of an exemplary embodiment of an access control apparatus according to the invention.

FIG. 10 is a block diagram of an exemplary embodiment of the access control apparatus 30 according to the invention. As illustrated in FIG. 1, the access control apparatus 30 may be arranged, for example, inside the parcel box 1, for example in the vicinity of the drive 14 (see FIG. 1).

Processor 31 of the access control apparatus is in the form of a microcontroller, in particular. Processor 31 executes program instructions stored in program memory 32 and stores intermediate results or the like, for example, in main memory 33. For example, program memory 32 is a non-volatile memory such as a flash memory, a magnetic memory, an EEPROM memory, a persistent memory such as a ROM memory and/or an optical memory. Main memory 33 is, for example, a volatile or non-volatile memory, in particular a random access memory (RAM) such as a static RAM memory (SRAM), a dynamic RAM memory (DRAM), a ferroelectric RAM memory (FeRAM) and/or a magnetic RAM memory (MRAM).

Program memory 32 and main memory 33 are preferably arranged together with processor 31 in a module.

Figure 11:
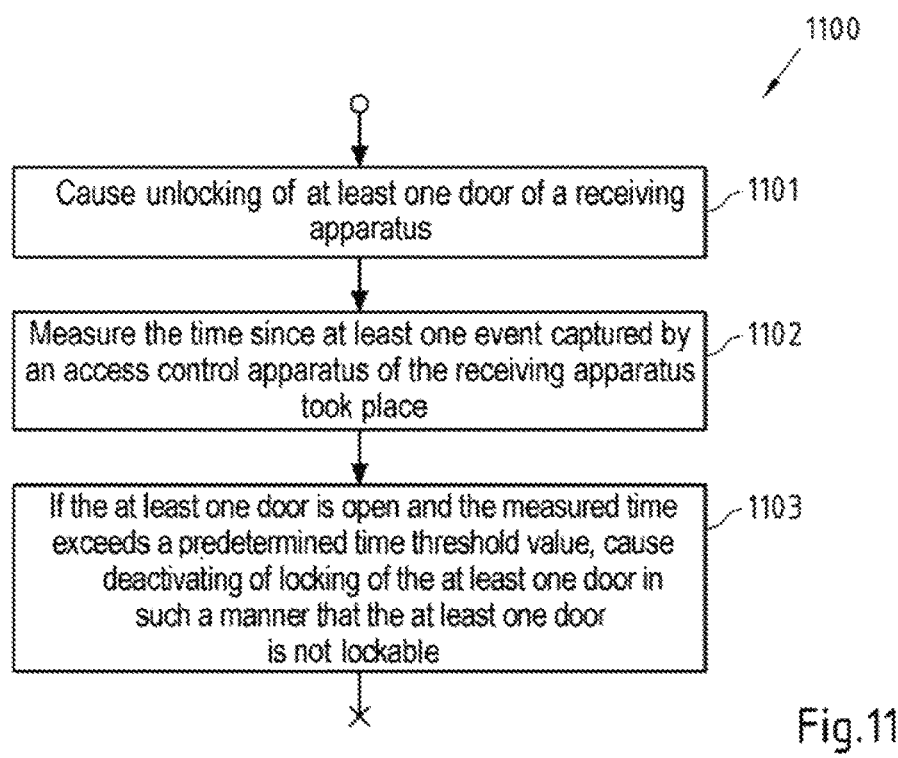
FIG. 11 shows a flowchart of an exemplary embodiment of a method according to the invention.
Figure 12:
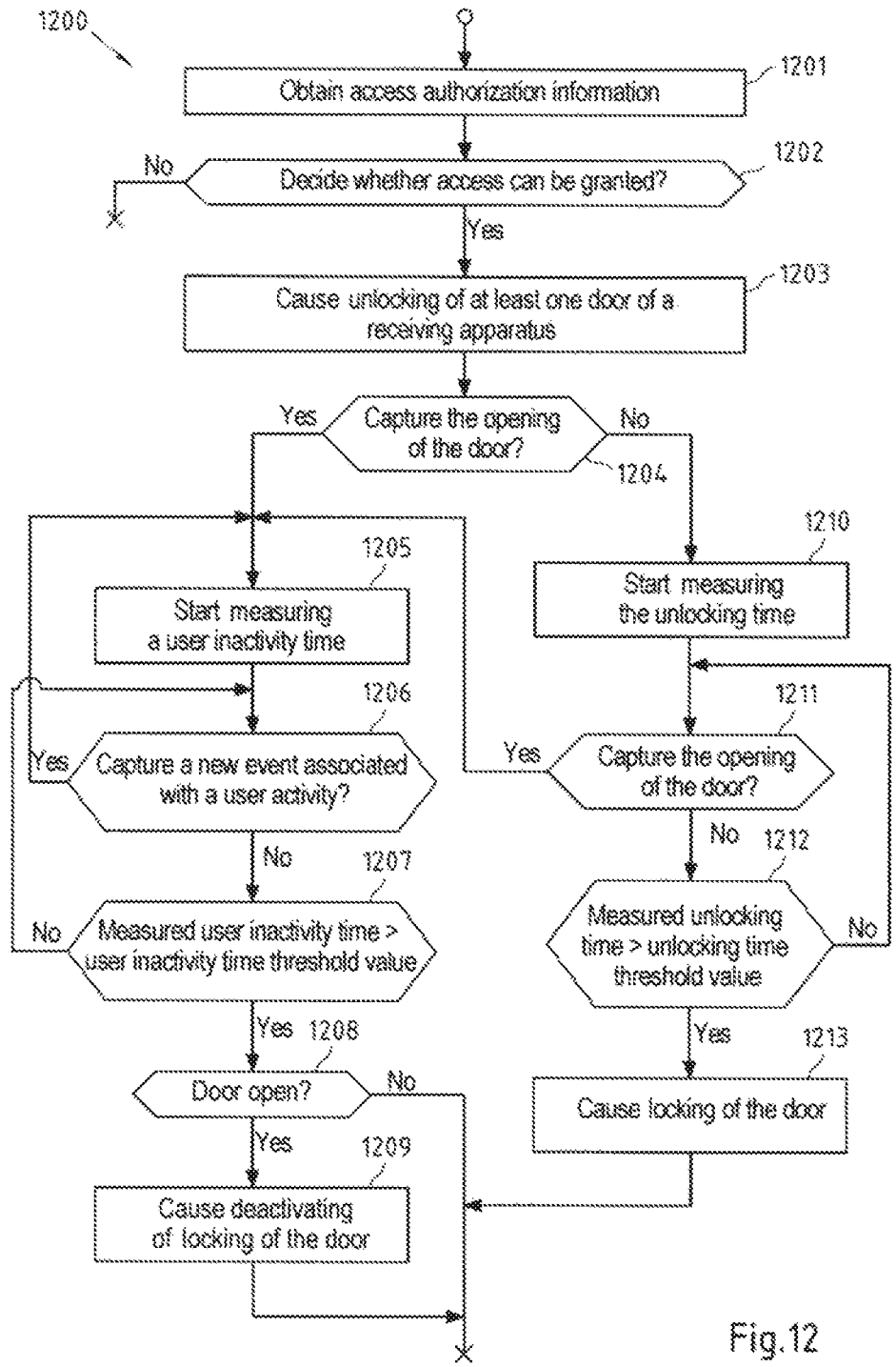
FIG. 12 shows a flowchart of an example of a method according to the invention.

Program memory 32 stores, for example, program instructions which cause the processor 31 to at least partially perform and/or control the methods illustrated in FIGS. 11 and 12 when it executes the program instructions. The program memory 32 or a separate (for example persistent) memory can also store information which is used when checking the authorization of a person to open one or more doors 6, 7 of the parcel box 1 (for example an identifier of the parcel box 1 and/or of the access control apparatus 30, one or more keys for checking an item of access authorization information, etc.).

The communication interface 34 is configured, for example, to communicate according to a wireless communication technology. It is assumed below by way of example that the wireless communication technology is NFC. For example, the communication interface 34 is at least partially formed by an integrated NFC transceiver such as the CR95HF NFC transceiver from ST Microelectronics and an NFC antenna (for example a magnetic antenna). Optionally, the access control apparatus may also comprise, for example, one or more further communication interfaces, for example a further communication interface which is configured to communicate according to Bluetooth. For example, this further communication interface is at least partially formed by a Bluetooth transceiver and a Bluetooth antenna.

The processor 31 may communicate with other apparatuses such as an access authorization verification apparatus via the communication interface 34, for example. Processor 31 is operatively connected to the communication interface 34, for example. The communication interface 34 may receive or request information from other apparatuses, for example, and can forward said information to processor 31 and/or may receive information from processor 31 and may transmit said information to other apparatuses. For example, processor 31 at least partially controls the communication interface 34.

The processor also controls a drive controller 35 which is configured to control the drive (see FIG. 1). The drive controller is part of the drive 14, for example. However, it is also conceivable for the drive controller not to be part of the drive 14. For example, control signals from the processor 31 are converted into voltage signals for the drive 14 in the drive controller 35 in order to move the common drive element 13 coupled to the drive 14 into a first or second adjustment position or into the closed position. The movement position assumed by the common drive element 13 can be checked, for example, using one or more of the sensors 36 (for example a magnetic field sensor, as already stated above) and can be included in the control process, for example.

Further ones of the optional sensors 36 are used, for example, to capture whether respective ones of the doors 6, 7 are open or closed. As explained above, these may be door opening sensors, for example, which are each fitted to the ejection rams 19, for example. The sensors 36 forward corresponding information to the processor 31, for example, or provide the processor 31 with corresponding information for retrieval.

Processor 31 can also control one or more optionally present input/output units 37. An input/output unit 37 is, for example, a keyboard, a display unit, a microphone, a touch-sensitive display unit, a loudspeaker, a reader, a disk drive, a luminaire, a light-emitting diode, an optical capture means (for example a scanner) and/or a camera. An input/output unit 37 may record inputs by a user, for example, and may forward said inputs to processor 31 and/or may receive and output information for the user from processor 31.

The components 31 to 37 may be formed together as a module, for example, or may be at least partially formed as individual modules in order to ensure easy exchangeability in the event of any defects. In addition to the components 31 to 37, access control apparatus 30 may comprise further components and is not restricted to these components. For example, the access control apparatus may comprise one or more energy supply means such as a battery as a further component.

FIG. 11 is a flowchart 1100 which illustrates, by way of example, the steps of a method according to the invention. The steps illustrated in the flowchart 1100 are performed and/or controlled by components of the access control apparatus 30. For example, the steps are at least partially performed and/or controlled by the processor 31 of the access control apparatus 30.

In a step 1101, unlocking of at least one of the doors 6, 7 of the parcel box 1 is caused. For example, the processor 31 causes unlocking of at least one of the doors 6, 7. The doors 6, 7 are unlocked, for example, if the bolt elements of the doors 6, 7 are released and the doors 6, 7 can be opened (for example are automatically opened).

For example, the processor 31 is configured to control the drive controller 35 in such a manner that the drive 14 rotates the rod 13 into the first adjustment position, with the result that the locking hook 11 of the first locking module 9 releases a bolt element of the door 6 and the door 6 can be opened. For example, the processor 31 is configured to control the drive controller 35 in such a manner that the drive 14 rotates the rod 13 into the second adjustment position, with the result that the locking hook 11 of the first locking module 9 releases a bolt element of the door 6 and the door 6 can be opened and the locking hook 11 of the second locking module 10 releases a bolt element of the door 7 and the door 7 can be opened.

In a step 1102, the time since at least one event captured by the access control apparatus 30 of the parcel box 1 took place is measured. For example, the time is measured by the processor 31.

As described above, an event captured by the access control apparatus 30 is intended to be understood as meaning, for example, any event which is capturable by the access control apparatus 30 and indicates the presence of a user in the environment of the parcel box 1. For example, such an event is an event associated with a user activity. If such an event associated with a user activity initiates measuring of the time, the measured time is, for example, a measure of the time elapsed since the last user activity. For example, the at least one event captured by the access control apparatus 30 (for example an event associated with a user activity) is detecting a presence of an access authorization verification apparatus in the environment of the access control apparatus 30, obtaining information such as an item of access authorization information from an access authorization verification apparatus and/or from a user, interacting with a user such as recording an input by the user, causing unlocking of the door and/or opening of the door.

For example, the processor 31 is configured to start measuring the time when an event is captured by the access control apparatus 30 and to measure the time. For example, the access control apparatus captures the at least one event by means of the communication interface 34, the sensors 36 and/or the input/output unit 37.

In a step 1103, deactivating of locking of at least one of the doors 6, 7 is caused in such a manner that the at least one door is not lockable if the at least one of the doors 6, 7 is open and the measured time exceeds a predetermined time threshold value. For example, the processor 31 causes deactivating of locking.

Deactivating locking of the at least one of the doors 6, 7 is intended to be understood as meaning, for example, that the door is not lockable (that is to say can be opened from inside and from outside, for example can be opened by pushing against the door or pulling on the door). For example, locking of the door 6 is deactivated if the rod 13 is rotated from the closed position into the first adjustment position by the drive 14 and is held there against the tensioning force of the restoring spring 21. This is because, in this adjustment position, the bolt element of the door 6 cannot engage in the hook opening in the locking hook 11 of the locking module 9 in order to lock the door upon closing. Locking of the doors 6, 7 can be deactivated in a similar manner if the rod 13 is rotated from the closed position into the second adjustment position by the drive 14 and is held there against the tensioning force of the restoring spring 21. For example, the processor 31 is configured to accordingly control the drive controller 35.

The time threshold value is selected, for example, in such a manner that the probability of the user (for example the user/delivery agent) who has opened the door still being in the vicinity of the access control apparatus is low. Deactivating locking of the door at this time can therefore prevent the door being locked without supervision and/or unintentionally (for example by children playing).

One possible configuration of measuring the time and causing deactivating of locking of the at least one of the doors 6, 7 is described below with reference to steps 1204 to 1209 of the flowchart 1200 (see FIG. 12).

FIG. 12 is a flowchart 1200 which illustrates the steps of one example of a method according to the invention. The steps illustrated in the flowchart 1200 are performed and/or controlled by components of the access control apparatus 30. For example, the steps are at least partially performed and/or controlled by the processor 31 of the access control apparatus 30.

It is assumed by way of example below that a user (for example a delivery agent or a user) of the parcel box 1 wishes to have access to the first receiving compartment of the parcel box.

In a step 1201, access authorization information is obtained. For example, the communication interface 34 obtains the access authorization information from an access authorization verification apparatus belonging to the user in step 1201.

In a step 1202, it is decided whether access can be granted, at least partially on the basis of the access authorization information obtained. For example, the processor 31 checks in step 1202 whether the access authorization information obtained authorizes access. Various configurations of the access authorization information and its checking have already been explained above.

If it is decided in step 1202 that access can be granted, the flowchart 1200 is continued with step 1203. Otherwise, the flowchart 1200 ends.

In a step 1203, unlocking of the door 6 of the parcel box 1 is caused. For example, the processor 31 causes unlocking of the door 6. For example, processor 31 controls the drive controller 35 in step 1203 in such a manner that the drive 14 rotates the rod 13 into the first adjustment position, with the result that the locking hook 11 of the first locking module 9 releases a bolt element of the door 6 and the door 6 can be opened. Step 1202 corresponds to step 1103 described above, for example.

A step 1204 checks whether the opening of the door 6 is captured. For example, the processor 31 checks in step 1204 whether one of the sensors 36 captures whether the door 6 is opened. For example, one of the sensors 36 described above (for example a door opening sensor arranged on an ejection ram 19) captures the opening of the door 6 in step 1204 and forwards a corresponding piece of information to the processor 31. As described above, the doors 6, 7 of the parcel box 1 are automatically opened if they are locked. However, configurations in which the doors 6, 7 are not automatically opened or in which the automatic opening of the doors 6, 7 of the parcel box 1 is blocked are also conceivable.

After opening the door, the rod 13 is for example changed by the drive 14 from the first adjustment position into the closed position again in order to activate the latch function of the snap closure. For example, the processor 31 is configured to accordingly control the drive controller 35.

As described above, the opening of a door is an event associated with a user activity. If opening of the door 6 is captured in step 1204, the flowchart 1200 is continued with steps 1205 to 1209 in order to possibly be able to cause deactivating of locking of the door 6. Otherwise, the flowchart 1200 is continued with steps 1210 to 1213 in order to be able to possibly lock the unopened door 6 again.

In a step 1205, measuring of the user inactivity time is started. For example, the processor starts measuring of the user inactivity time and measures the user inactivity time (for example by means of a timer function and/or a clock).

A step 1206 checks whether a new event associated with a user activity is captured. For example, the processor 31 checks in step 1206 whether one of the sensors 36, the communication interface 34 and/or the input/output unit 37 capture(s) a new event associated with a user activity.

As described above, an event associated with a user activity is intended to be understood as meaning, for example, any event which can be caused by a user and/or indicates the presence of a user in the environment of the parcel box. An event associated with a user activity is triggered by a user activity and/or is a user activity, for example. One example of such a user activity is, for example, a presence of a user (for example a user having an access authorization verification apparatus) in the environment of the access control apparatus 30, obtaining information such as an item of access authorization information from an access authorization verification apparatus and/or from a user, interacting with a user such as recording an input by the user on the input/output unit 37, opening the door 6 and/or closing the door 6.

If a new event associated with a user action is not captured in step 1206, the flowchart 1200 is continued with step 1207. Otherwise, measuring of the user inactivity time is ended, for example, and the flowchart 1200 jumps to step 1205 in which new measuring of the user inactivity time is started.

A step 1207 checks whether the measured user inactivity time is greater than a user inactivity time threshold value. For example, the processor 31 checks whether the measured user inactivity time is greater than a user inactivity time threshold value stored in program memory 32.

If the measured user inactivity time in step 1207 is greater than the user inactivity time threshold value, measuring of the user inactivity time is ended, for example, and the flowchart 1200 is continued with step 1208. Otherwise, the flowchart 1200 jumps to step 1206 and measuring of the user inactivity time is continued.

A step 1208 checks whether it is captured that the door 6 is open. For example, the processor 31 checks in step 1208 whether one of the sensors 36 captures whether the door 6 is open. For example, one of the sensors 36 described above (for example a door opening sensor arranged on an ejection ram 19) captures whether the door 6 is open in step 1208 and forwards a corresponding piece of information to the processor 31.

If the door 6 in step 1208 is open (or it is captured in step 1208 that the door 6 is open), the flowchart 1200 is continued with step 1209. Otherwise, the flowchart 1200 is ended.

In step 1209, deactivating of locking of the door 6 is caused. For example, the deactivation of the latch function of the snap closure is caused in step 1209. For example, the processor 31 causes deactivating of locking. Step 1209 corresponds, for example, to step 1103 of the flowchart 1100. The flowchart 1200 then ends.

As described above, deactivating of locking of the door 6 can be reversed, for example, if an item of access authorization information which authorizes access to the first receiving compartment of the parcel box 1 is obtained. For example, the processor 31 is configured in this case to cause activating of locking of the door 6. Locking of the door 6 is activated, for example, if the rod 13 is rotated from the first adjustment position into the closed position by the drive 14. For example, the processor 31 accordingly controls the drive controller 35.

As described above, the flowchart is continued with steps 1210 to 1213 after step 1204, if no opening of the door 6 is captured in step 1204, in order to be able to possibly lock the unopened door 6 again.

Measuring of the unlocking time is started in a step 1210. For example, the processor 31 starts measuring the unlocking time and measures the unlocking time (for example by means of a timer function or a clock).

A step 1211 again checks whether the opening of the door 6 is captured. Step 1211 corresponds to step 1204, for example.

If opening of the door 6 is captured in step 1211, measuring of the unlocking time is ended, for example, and the flowchart 1200 jumps to step 1205. Otherwise, the flowchart 1200 is continued with step 1212.

A step 1212 checks whether the measured unlocking time is greater than an unlocking time threshold value. For example, the processor 31 checks whether the measured unlocking time is greater than an unlocking time threshold value stored in program memory 32.

If the measured time in step 1212 is greater than the unlocking time threshold value, measuring of the unlocking time is ended, for example, and the flowchart 1200 is continued with step 1213. Otherwise, the flowchart 1200 jumps to step 1211 and measuring of the unlocking time is continued.

In step 1213, locking of the door 6 is caused. For example, the processor 31 causes locking of the door 6. The flowchart 1200 then ends.

The door 6 is locked, for example, if the rod 13 is rotated from the first adjustment position into the closed position by the drive 14. This is because, in this closed position, the bolt element of the door 6 can engage in the hook opening in the locking hook 11 of the locking module 9 in order to lock the door 6. For example, the processor 31 is configured to accordingly control the drive controller 35.

Figure 13:
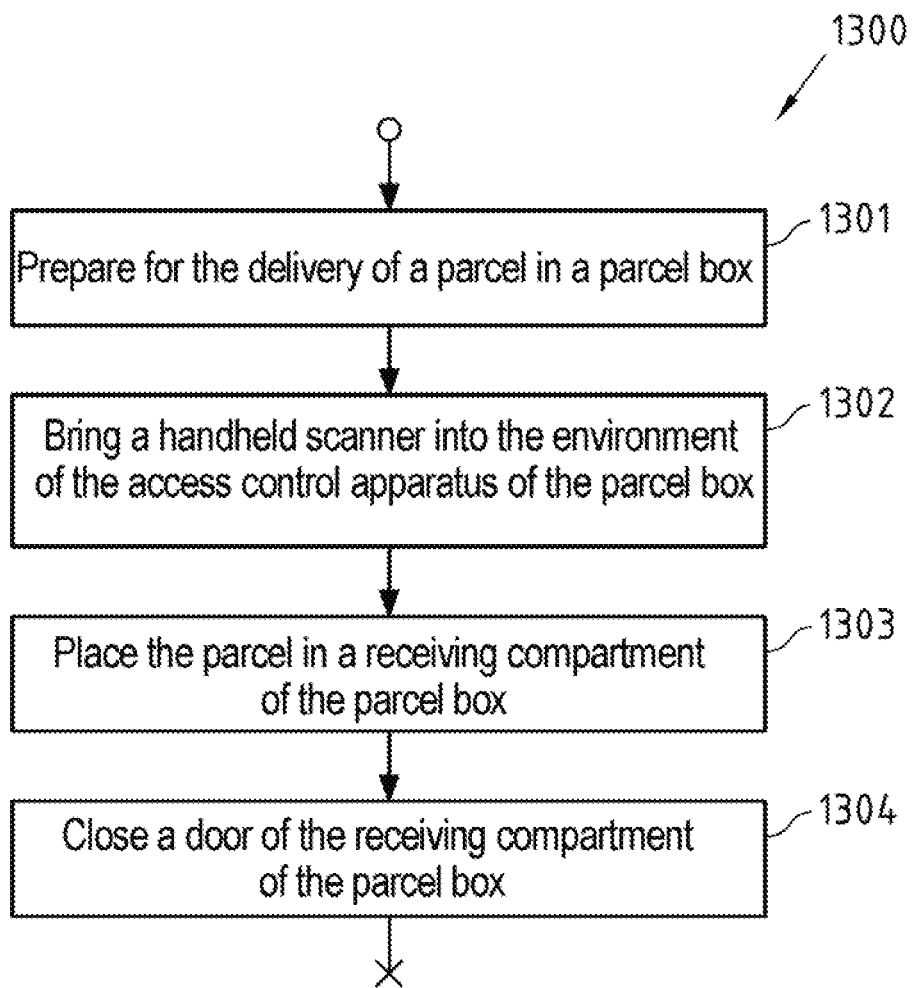
FIG. 13 shows a flowchart of an example of a use according to the invention.

FIG. 13 is a flowchart 1300 which illustrates the steps of an example of a use according to the invention. The steps illustrated in the flowchart 1300 are performed by a delivery agent for the parcel box 1 and are described below from the perspective of the delivery agent. In the example illustrated in FIG. 13, the delivery agent wishes to open the door 6 of the parcel box 1 in order to be able to place a parcel in the first receiving compartment and therefore deliver said parcel. In this example, it is assumed that the delivery agent uses a handheld scanner (for example Honeywell's LXE Tecton MX7) as the access authorization verification apparatus.

In a step 1301, the delivery agent prepares for the delivery of the parcel in the parcel box 1.

For example, the delivery agent scans a barcode applied to the parcel using the handheld scanner in step 1301. As a result, the handheld scanner can identify the parcel, for example, and can retrieve the shipment information assigned to the parcel. The shipment information contains, for example, information relating to possible delivery of the parcel to a parcel box belonging to the recipient. For example, one or more parcel boxes to which the parcel can be delivered are indicated to the delivery agent on the handheld scanner.

For example, the delivery agent confirms the parcel box 1 in which he would like to place the parcel or chooses the parcel box 1 in which he would like to place the parcel from the parcel boxes indicated in step 1301. As a result, it can be ensured, for example, that the delivery agent also places the parcel in a parcel box assigned to the parcel or to the recipient of the parcel and the search comprising many data records is simplified. Furthermore, the handheld scanner can use the confirmed or selected parcel box 1 to retrieve or generate an item of access authorization information authorizing access to the first receiving compartment of the parcel box 1.

In a step 1302, the delivery agent brings the handheld scanner into the environment of the access control apparatus 30 of the parcel box 1.

For example, the delivery agent holds the handheld scanner in the environment of the access control apparatus 30 in such a manner that the handheld scanner is detectable by the communication interface 34 and can communicate with the communication interface 34. The handheld scanner then communicates the access authorization information to the communication interface 34 for example (for example via Bluetooth, in which case the MAC address of the access control apparatus was disclosed to the handheld scanner in order to avoid Bluetooth pairing). For example, as described above, the door 6 of the parcel box 1 is unlocked and opened when the access authorization information authorizes access to the first receiving compartment of the parcel box 1. The delivery agent receives corresponding feedback, for example, from the handheld scanner (for example a message stating that access is granted is displayed).

Solely by virtue of the delivery agent bringing the handheld scanner into the environment of the access control apparatus 30 of the parcel box 1 can he therefore cause unlocking and opening of the door 6 of the parcel mailbox 1.

As described above, the opening of the door 6 is captured, for example, and measuring of the user inactivity time is started.

In a step 1303, the delivery agent places the parcel in the first receiving compartment of the parcel box 1.

In a step 1304, the delivery agent closes the door 6 of the first receiving compartment of the parcel box 1. For example, the delivery agent closes the door 6 before the measured user inactivity time exceeds the user inactivity time threshold value. As described above, the door 6 is automatically locked, for example, on account of a latch function of the snap closure and the causing of deactivating of locking of the door 6 is prevented.

The exemplary embodiments of the present invention described in this specification are also intended to be understood as having been disclosed in all combinations with one another. In particular, the description of a feature included in an embodiment—unless explicitly explained to the contrary—is also not intended to be understood in the present case as meaning that the feature is imperative or essential for the function of the exemplary embodiment. The sequence of the method steps described in this specification in the individual flowcharts is not compulsory and alternative sequences of the method steps are conceivable. The method steps can be implemented in various ways; an implementation in software (by means of program instructions), hardware or a combination of the two in order to implement the method steps is thus conceivable. Terms used in the patent claims such as "comprise", "have", "include", "contain" and the like do not exclude further elements or steps. The wording "at least partially" includes both the case of "partially" and the case of "completely". The wording "and/or" is intended to be understood as meaning the fact that both the alternative and the combination are intended to be disclosed, that is to say "A and/or B" means "(A) or (B) or (A and B)". In the context of this specification, a plurality of units, persons or the like means a plurality of units, persons or the like. The use of the indefinite article does not exclude a plurality. An individual device may perform the functions of a plurality of units or devices mentioned in the patent claims. Reference symbols indicated in the patent claims should not be considered to be restrictions of the means and steps used.

The invention claimed is:

1. A method for deactivating locking of at least one door of a receiving apparatus, the method comprising:
   causing unlocking of the at least one door,
   capturing opening of the at least one door,
   measuring time since at least one event captured by an access control apparatus of the receiving apparatus took place, and
   if the at least one door is opened and the measured time exceeds a predetermined time threshold value, causing deactivating of locking of the at least one door in such a manner that the at least one door is not lockable.

2. The method according to claim 1, wherein the at least one event captured by the access control apparatus is at least one of detecting a presence of an access authorization verification apparatus in the environment of the access control apparatus, obtaining access authorization information from the access authorization verification apparatus or from a user, recording of an input by the user, causing unlocking of the door or opening of the door.

3. The method according to claim 1, the receiving apparatus comprising locking means which are configured to lock the at least one door.

4. The method according to claim 3, the locking means comprising a latch which is configured to automatically lock the at least one door upon closing, and wherein the locking of the at least one door being deactivated if the latch is held in an open position.

5. The method according to claim 1, the at least one event captured by the access control apparatus being an event associated with a user activity.

6. The method according to claim 1, the method further comprising:
obtaining access authorization information for granting access,
deciding whether access can be granted, at least partially on the basis of the access authorization information obtained, and
causing unlocking of the at least one door only if it has been decided that access can be granted.

7. The method according to claim 1, the method further comprising:
detecting a presence of an access authorization verification apparatus in an environment of the access control apparatus.

8. The method according to claim 1, the method further comprising:
capturing the event, and
starting measuring of the time.

9. The method according to claim 1, the method further comprising:
ending measuring of the time if at least one new event captured by the access control apparatus has taken place, and
measuring the time since the at least one new event captured by the access control apparatus took place.

10. The method according to claim 1, the predetermined time threshold value being less than or equal to 15 minutes.

11. The method according to claim 1, the method further comprising:
measuring the unlocking time since the causing of unlocking of the at least one door, and
if the at least one door has not been opened since the causing of unlocking and the measured unlocking time exceeds a predetermined unlocking time threshold value, causing locking of the at least one door.

12. The method according to claim 11, the method also comprising:
causing the access control apparatus to switch to an energy-saving mode if the measured unlocking time exceeds the unlocking time threshold value.

13. The method according to claim 1, the method further comprising:
obtaining access authorization information for activating locking of the at least one door if locking of the at least one door is deactivated,
deciding whether access can be granted, at least partially on the basis of the access authorization information obtained, and
causing activating of the locking of the at least one door only if it has been decided that access can be granted.

14. The method according to claim 1, the method further comprising:
opening the at least one door, and/or
closing the at least one door.

15. A non-transitory machine readable storage medium having stored thereon a computer program comprising program instructions which cause a processor to perform and/or control the method according to claim 1 when the computer program runs on the processor.

16. An access control apparatus comprising at least one processor and at least one memory which comprises program code, the memory and the program code being configured to cause the apparatus to perform or control:
causing unlocking of at least one door;
capturing opening of the at least one door;
measuring time since at least one event captured by the access control apparatus of a receiving apparatus took place; and
if the at least one door is opened and the measured time exceeds a predetermined time threshold value, causing deactivating of locking of the at least one door in such a manner that the at least one door is not lockable.

17. A receiving apparatus comprising:
a housing,
at least one door for closing at least one housing opening,
locking means which are configured to lock and unlock the at least one door, and
an access control apparatus according to claim 16.

18. A system comprising:
a receiving apparatus according to claim 17, and
an access authorization verification apparatus.

19. The use of the receiving apparatus according to claim 18 in such a manner that the at least one door of the receiving apparatus is closed in order to prevent the causing deactivating of locking of the at least one door in such a manner that the at least one door is not lockable.

20. The access control apparatus according to claim 16, wherein the at least one event captured by the access control apparatus is at least one of detecting a presence of an access authorization verification apparatus in the environment of the access control means, obtaining access authorization information from an access authorization information from an access authorization verification apparatus or from a user, recording of an input by the user, causing unlocking of the door or opening of the door.

* * * * *